(12) United States Patent
Kehoe

(10) Patent No.: US 10,871,292 B2
(45) Date of Patent: Dec. 22, 2020

(54) BASEBOARD HEATER COVER

(71) Applicant: Christopher Kehoe, New Hampton, NY (US)

(72) Inventor: Christopher Kehoe, New Hampton, NY (US)

( * ) Notice: Subject to any disclaimer, the term of this patent is extended or adjusted under 35 U.S.C. 154(b) by 105 days.

(21) Appl. No.: 16/156,005

(22) Filed: Oct. 10, 2018

(65) Prior Publication Data
US 2020/0116364 A1  Apr. 16, 2020

(51) Int. Cl.
*F24D 19/06* (2006.01)
*F24D 3/10* (2006.01)
*F24D 19/00* (2006.01)
*F24D 3/16* (2006.01)

(52) U.S. Cl.
CPC ......... *F24D 19/067* (2013.01); *F24D 3/1066* (2013.01); *F24D 3/16* (2013.01); *F24D 19/0097* (2013.01); *F24D 19/062* (2013.01); *F24D 19/068* (2013.01)

(58) Field of Classification Search
CPC ...... F24D 19/06; F24D 19/061; F24D 19/062; F24D 19/063; F24D 19/064; F24D 19/065; F24D 19/067; F24D 19/068
See application file for complete search history.

(56) References Cited

U.S. PATENT DOCUMENTS

| | | | |
|---|---|---|---|
| 3,051,816 A | 8/1962 | Knoll et al. | |
| 3,448,795 A * | 6/1969 | McNabney | F24D 19/04 165/55 |
| 4,250,954 A * | 2/1981 | Remlinger | F24D 19/04 165/129 |
| 5,454,512 A | 10/1995 | Berlaimoni | |
| 5,884,690 A * | 3/1999 | Zussman | F24D 19/04 118/504 |
| 6,085,985 A * | 7/2000 | LaSelva | F24D 19/06 165/55 |
| 6,834,710 B2 * | 12/2004 | Weintraub | F24D 19/04 165/55 |
| 7,789,129 B1 * | 9/2010 | Barden | F24D 19/0087 165/244 |
| 7,988,077 B2 | 8/2011 | Lin | |
| 10,295,198 B1 * | 5/2019 | Freedman | F24D 19/064 |
| 2003/0230396 A1 * | 12/2003 | Weintraub | F24D 19/04 165/55 |

(Continued)

*Primary Examiner* — Avinash A Savani
*Assistant Examiner* — Deepak A Deean
(74) *Attorney, Agent, or Firm* — Michael E. Zall

(57) ABSTRACT

A baseboard heating system mounted proximate a juncture of a wall and a floor of a room. The system includes a length of longitudinal piping for the passage of a heated liquid there through and radiating heat fins surrounding the length of longitudinal piping. A heat reflective metal backplate is mounted to the wall behind the length of longitudinal piping and the radiating heat fins. A baseboard heater cover is adapted to cover the piping and heat fins either as an original heater cover or a replacement. The heater cover is supported by the floor and extends at least the length of the longitudinal piping and the radiating heat fins. The heater cover is removably, adjustably and magnetically coupled to the heat reflective metal backplate. The heater cover may be selectively removed to access the longitudinal piping and radiating heat fins and be easily adjusted for proper placement.

5 Claims, 10 Drawing Sheets

(56) References Cited

U.S. PATENT DOCUMENTS

| | | |
|---|---|---|
| 2014/0109450 A1 | 4/2014 | Valois |
| 2014/0298625 A1* | 10/2014 | Gual .................... E04F 13/144 24/303 |
| 2016/0047117 A1 | 2/2016 | DeRita |
| 2016/0273785 A1 | 9/2016 | Marino et al. |
| 2017/0097193 A1* | 4/2017 | Stanley .................... F28D 1/04 |

* cited by examiner

BASEBOARD HEATER COVER

FIELD OF THE INVENTION

This invention relates to a baseboard heater system, typically an hydronic baseboard heater system, and more particularly to a baseboard heater system that has a removable baseboard heater cover arrangement. This invention also relates to a replacement baseboard heater cover for use in retrofitting an existing baseboard heater cover system that is typically constructed of sheet metal.

A baseboard heating system typically includes not only a metal covering, but a heat reflective metal back plate mounted to the wall behind the radiating heat fins. The baseboard heater cover of this invention, which may be used in a new installation or a retrofit to a typical metal cover for the heating system, includes a magnetic coupling system that couples the heater cover to the metal back plate for easy replacement, positioning and removability of the cover from the baseboard heating system. The baseboard heater cover includes a unique coupling system to magnetically couple the heater cover to the back plate for ease of positioning, removing and replacing the heater cover.

This invention, which is primarily (but not solely) directed to a baseboard heater cover made of wood, pressboard, composite materials or molded plastic, that replaces the known metal cover to the baseboard heater system, typically an hydronic baseboard heater system. Such a heater cover provides reduced noise and eliminates rust. The heater cover is lightweight, easy to manufacture and install, and prevents other problems associated with the metal baseboard heater covers now in use. Additionally, the replacement baseboard heater cover, which can include a damper cap trim piece, can be shaped and colored to be decoratively attractive, for example, match the molding adjacent and/or surrounding the baseboard heater.

BACKGROUND OF THE INVENTION

Conventional residential and commercial baseboard heaters for rooms/office space/stores, etc. employ horizontal, copper piping that carries hot water there through from the water boiler/heater system. The copper piping passes through aligned apertures of aluminum radiating heat fins. When the heating system is "on" a pump causes the highly heated water to pass through the copper pipes. The copper pipes transfer heat to the radiating heat fins that pass the heat from the water flowing through the copper to the air surrounding the fins. The known baseboard heating system also includes a heat reflective metal back plate mounted to the wall behind the radiating heat fins that that reflects the heat toward the interior of the room.

Typically, the copper piping and the radiating heat fins are protected by a metal baseboard heater cover which also protects the occupants from coming into contact with the hot copper tubing and radiating heat fins. The metal baseboard heater cover is secured, directly or indirectly, to the adjacent wall and/or the piping. The longitudinal heater cover is usually snap fit onto one or more spaced (and secured to the wall) bracket elements and, often, have one or more longitudinally extending metal damper caps which can be manually flipped opened or closed to permit the heated air to pass into the room. The angulation of the longitudinally extending metal damper caps allows the heater air to be directed upwardly and outwardly into the center of the room.

In operation, heated water from a boiler is pumped the copper pipes when called for by a room thermostat into and through the heat exchanger. By conduction, the hot water heats the copper tubing, which in turn heats the aluminum fins. The aluminum fins (providing substantially large relative surface area) are then able to radiate heat to the air in a room by convection.

Typically, the heater cover, brackets, and damper caps are manufactured from thin pieces of metal, preferably, lengths of thin-walled steel. Steel is commonly used in baseboard heaters because of its strength, durability, fire resistance, very low thermal expansion, negligible creep, availability, ease of forming into desired shapes, dimensions and configuration, and low cost.

The known baseboard heating systems suffer from several disadvantages. Specifically, the baseboard heater covers, damper cap trim piece, and end caps come into contact with steam or water, for example, shower water overspray, they tend rust. The covers on baseboard heating systems near toilets are notorious for rusting due to splashing of water and urine on the heater covers. Over time they also are damaged with dents, scrapes, rusting and various other issues that render them visually unsightly to a homeowner. Additionally, the aluminum fins, copper piping and metallic baseboard heater covers, each have their own coefficient of thermal expansion and contraction, which causes noise, upon startup and shutdown of the heating system.

Additionally, the metallic baseboard heater covers are relatively expensive to make, are heavy, and unattractive, particularly when they begin to rust, and are difficult to install or replace due to the current system of mounting them onto the baseboard heating system. The metallic nature of the cover also presents sharp edges which can cause injury to one trying to clean or install the covers. Additionally, the known covers can easily shift from their aligned positions but are difficult to realign on the baseboard heating system. They can also be unattractive and visually obtrusive when positioned within attractive moldings that are adjacent to and/or surrounding the molding.

It is thus highly desirable to provide an attractive, simple to install and position, baseboard heater cover which will not rust, is non-metallic, lightweight, and simple to clean, does not present sharp, metallic edges or surfaces and can blend in with the room décor, particularly the base floor molding, or other architectural design embellishments like wainscot or paneled walls.

The following references may be relevant to this invention:
U.S. Pat. No. 3,051,816 to Knoll.
U.S. Pat. No. 5,454,512 to Berlaimont.
U.S. Pat. No. 6,085,985 to LaSelva.
U.S. Pat. No. 7,988,077 to Lin.
US 20140109450 to Valois.
US 20160047117 to DeRita.
US 20160273785 to Marino.

OBJECTS AND SUMMARY OF THE INVENTION

The present invention provides a baseboard heater cover for use on a baseboard heating system, typically an hydronic baseboard heater system that is mounted to a wall.

The baseboard heater cover is designed to facilitate replacing the existing metallic cover on a baseboard heating system.

The heater cover has a magnetic coupling means that allows for easy installation, removal and repositioning for cleaning and vacuuming of dust and debris.

The heater cover of this invention is selectively, easily detachable from the baseboard heating system when it is desired to gain access to the radiator structure or adjacent components of the radiator to repair, replace or clean the heating system.

The baseboard heater cover of this invention is simple to install as a new construction baseboard heater system or to retrofit an old baseboard heater system by replacing the old cover system from an already installed baseboard heater systems.

The baseboard heater cover of this invention is preferably formed of wood, molded plastic or composites which will not deform under the expected temperatures, is non-rusting, lightweight, will not show dents, can come in colors and different molding configurations, and allows for the full circulation of the heated air through the heater cover.

The current invention allows a homeowner or contractor to custom configure the appearance of the baseboard heater cover in a visually pleasing way to match existing decor and trim being used within each room.

The heater covers may also be repainted or stained to a desired color or decorative motif.

The heater cover of this invention can be sized to accommodate various types of prior installations such as full room perimeter baseboard radiators, single smaller radiator sections within a room or be expanded by way of a heating contractor to provide additional heating zones during the course of remodeling or new construction.

The baseboard heating system of this invention is mounted proximate a juncture of a wall and a floor of a room. The system includes a length of longitudinal piping for the passage of a heated liquid there through and radiating heat fins surrounding the length of longitudinal piping. A heat reflective metal backplate is mounted to the wall behind the length of longitudinal piping and the radiating heat fins. The baseboard heater cover is adapted to covering the longitudinal piping and radiating heat fins. The baseboard heater cover is supported by the floor and extends at least the length of the longitudinal piping and the radiating heat fins. The heater cover is removably, adjustably and magnetically coupled to the heat reflective metal backplate.

The baseboard heater cover may be selectively removed to access the longitudinal piping and radiating heat fins. The baseboard heater cover may be easily adjusted for proper placement.

This invention is also directed to a replacement baseboard heater cover for a baseboard heating system, replacing the existing, typically metal, baseboard heater cover. The replacement baseboard heater cover covers the longitudinal piping and radiating heat fins, is supported by the floor and extends at least the length of the longitudinal piping and the radiating heat fins. The replacement cover is removably, adjustably and magnetically coupled to the heat reflective metal backplate. The replacement baseboard heater cover may be selectively installed and removed to access the longitudinal piping and radiating heat fins and the position of baseboard heater cover adjusted for proper placement.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

Further aspects, features and advantages of the present invention will become even more apparent with reference to the following detailed description and the accompanying drawings.

The drawings are not presented to scale but are only used to illustrate the principles of the invention. In the drawings, like reference numbers indicate like elements.

DETAILED DESCRIPTION OF THE INVENTION

Figure 1:
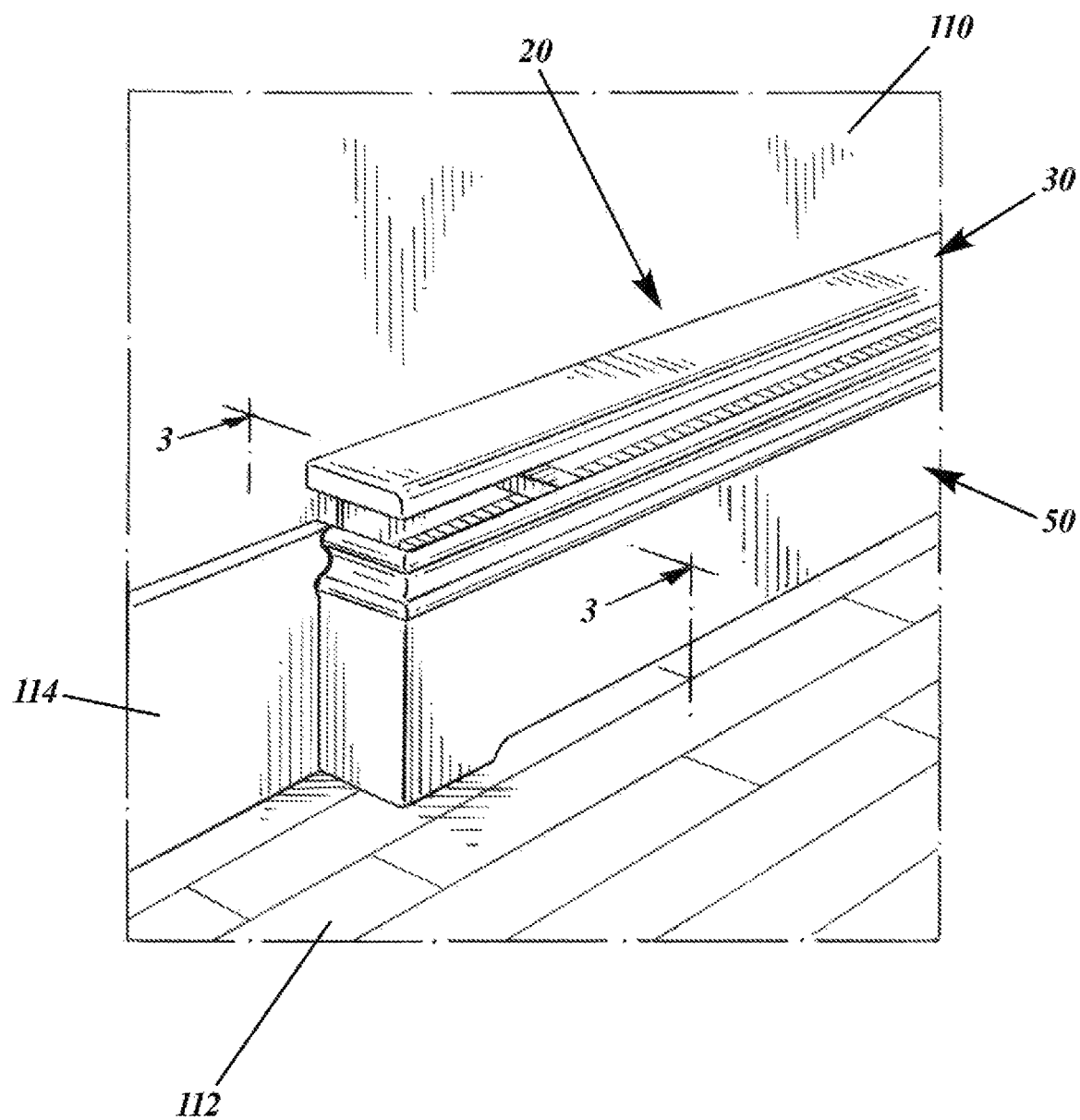
FIG. 1 is a perspective view illustrating an embodiment of the baseboard heater cover of the present invention in use on a conventional residential baseboard heating system, typically an hydronic baseboard heater system.

Detailed descriptions of the embodiments of this invention are provided herein along with accompanying figures that illustrate the principles of the embodiments. The scope of the embodiments is limited only by the claims and encompasses numerous alternatives, modifications and equivalents. Numerous specific details are set forth in the following description. These details are provided solely for the purposes of example and the embodiments may be practiced according to the claims without some or all of these specific details.

Referring to FIGS. 1 through 5, the base board heater cover is shown generally as 20. More specifically, the base board heater cover 20 is designed to enclose an hydronic baseboard hot-water heating system 100. The baseboard heating system 100 is mounted proximate a juncture of a wall 110 and a floor of a room 112. The base board heater cover may further include a top damper cap trim piece 30 and a primary heater cover 50. Elements 30 and 50 are designed to replace the standard sheet metal covers and end caps on existing baseboard heater systems 100, although the baseboard heater cover 20 and top damper cap trim piece 30 of this invention may be used on newly installed, baseboard heating systems 100 in homes, offices and other interior facilities.

Figure 2:
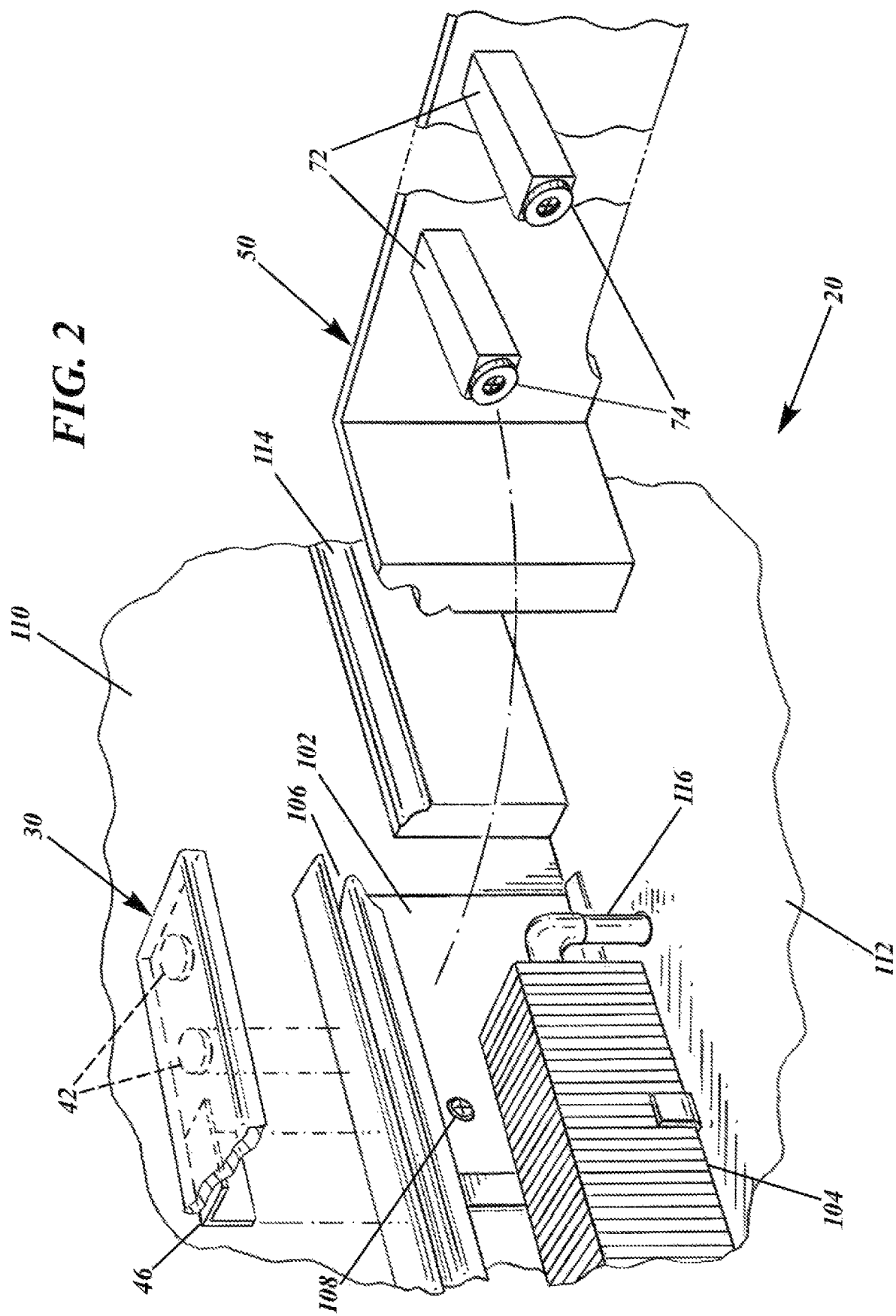
FIG. 2 is an exploded perspective view showing the relationship between the various elements of the baseboard heater cover of the present invention in use on a conventional baseboard heating system.
Figure 3:
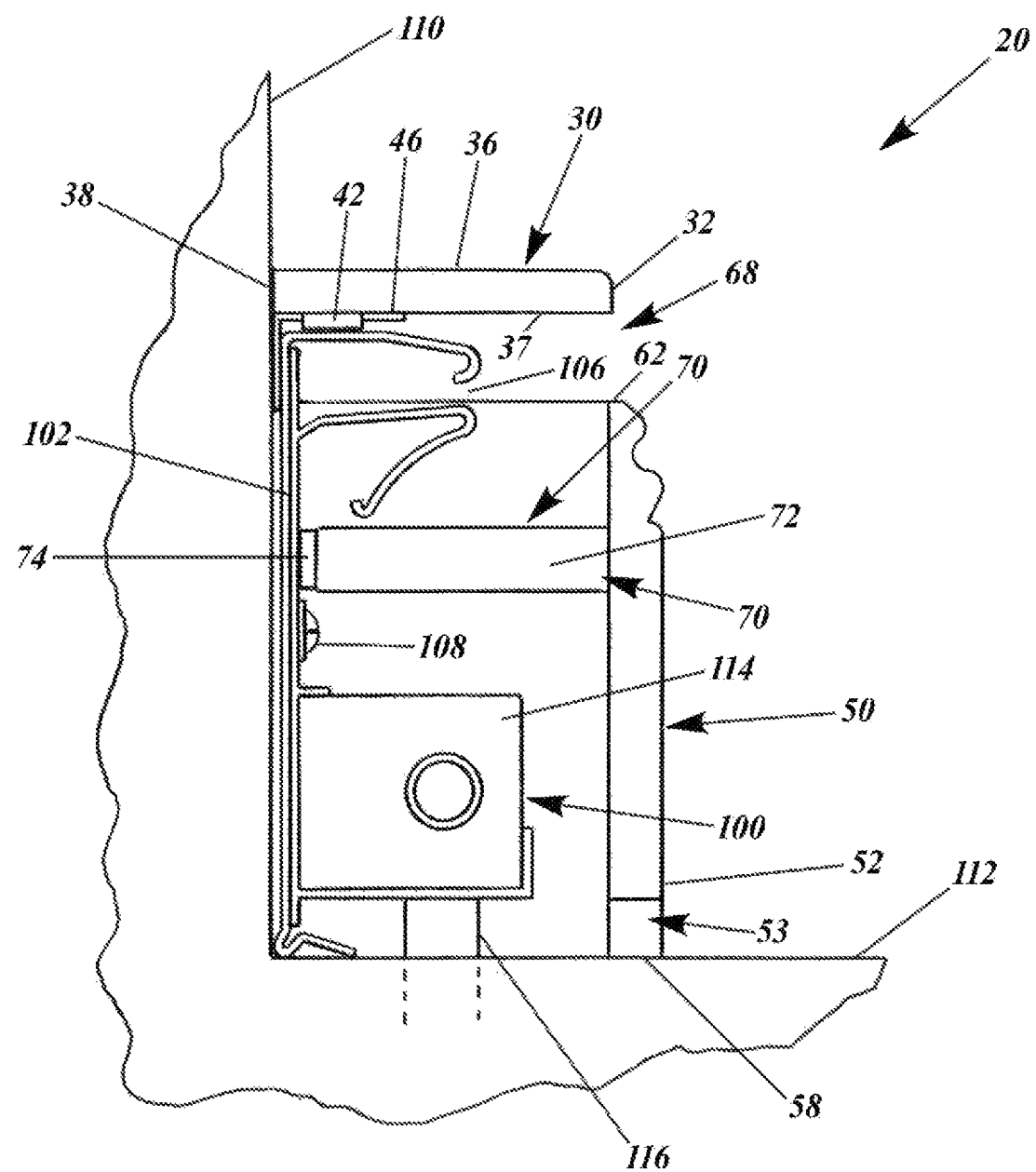
FIG. 3 is a schematic cross-sectional view taken along cross-section line 3-3 of FIG. 1 thereof.

Referring to FIGS. 1-3, the baseboard heating system 100 includes a length of longitudinal piping 116 for the passage of a heated liquid, generally water or steam, there through. Radiating heat fins 104 surround the length of longitudinal piping 116. A heat reflective metal backplate 102 is mounted to the wall 110 behind the length of longitudinal piping 116 and the radiating heat fins 104.

The primary heater enclosure 50 is designed and configured. e.g., size and weight, so that it may be easily removed, replaced and/or repositioned in the event of an existing or impending condition that requires its removal, replacement or repositioning from the baseboard heating system 100. A number of different materials can be used to achieve the purpose of the invention.

Preferably the primary heater enclosure 50 and damper cap trim piece 30 may be made of wood, pressboard, BORAL®, i.e., non-metal water-resistant panels, and plastics and can be made using a combination of conventional woodworking tools, CNC three-dimensional machining routers and 3D printers, etc. Referring, for Example to FIG. 3, the top surface 36 and bottom surface 37 of damper cap trim piece 30 and the front panel trim piece 52 of primary heater cover 50 may be provided with a prefinished surface, preferably a decorative surface that may, for example, be finished with paint, decorative wall paper, a lamination or other surface treatment. Alternatively, the primary heater cover 50 and/or damper cap trim piece 30 may be constructed from a material, such as, for example, plastic, vinyl, or glass and that material may form the finished panel surfaces, e.g., 36, 37 and/or 52.

Figure 4:
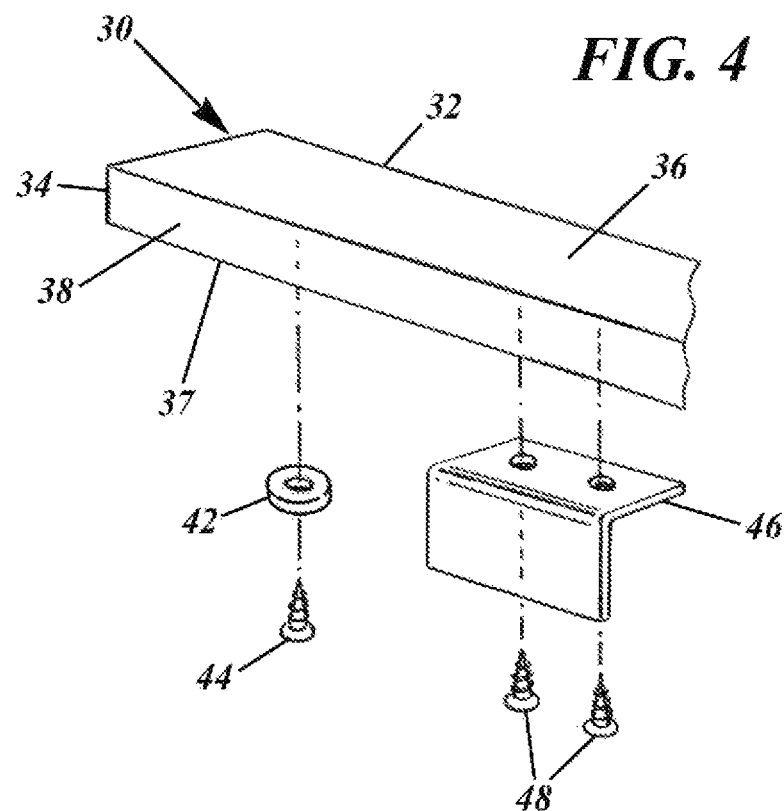
FIG. 4 is an exploded perspective view of the top damper cap trim piece and related parts of baseboard heater cover of the present invention.
Figure 5:
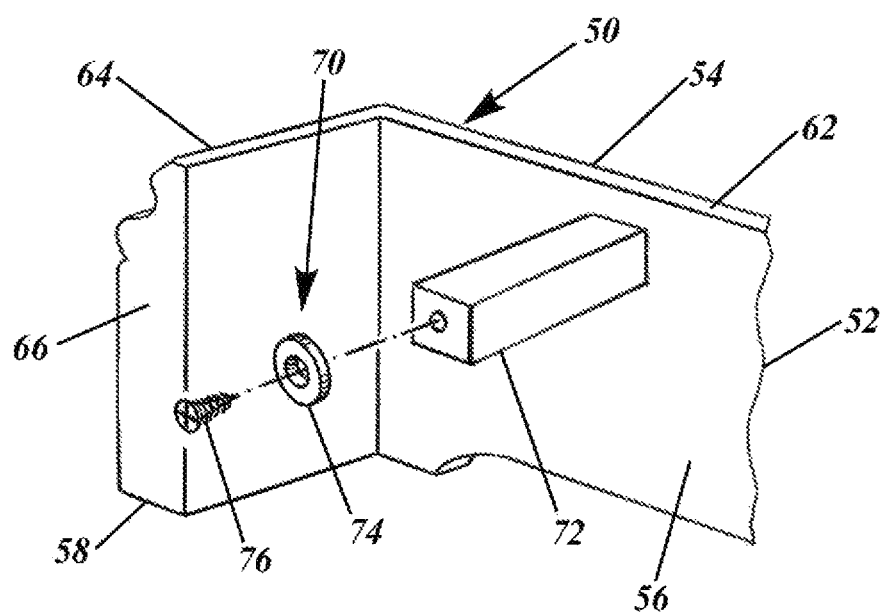
FIG. 5 is an exploded perspective view of the magnetic coupling system of baseboard heater cover and related parts thereof.

Referring to FIGS. 1 and 3 the invention is depicted assembled and enclosing the existing hydronic baseboard heater 100. FIGS. 2, 4 and 5 show the various parts expanded for greater understanding.

Referring, for example to FIG. 1-3, the baseboard heating system 100 allows cool air to enter the underside of the front face-plate or heater cover 50 through a gap or airspace at the floor level 53. For the present invention this is maintained by way of a bottom relief area 53 in the heater cover 50 and front panel trim piece 52 to allow cool air to enter and flow upwards over the heating fins 104 and then exit primary heater cover 50 via space 68 between top surface 62 of primary heater cover 50 and underside 37 of top damper cap 30. The heated air rises and passes into the room via the top vent space 68 created by the damper cap 106 and top damper cap trim piece 30.

Referring to FIGS. 1-3, particularly FIG. 3, the top damper cap trim piece 30 abuts wall 110. Primary heater cover 50 rests on top of floor 112 and is positioned against, adjacent or abutting baseboard 114, (see FIG. 2). The damper cap trim piece 30 and primary heater cover 50 are coupled to the baseboard heating system 100 by a magnetic coupling system 70. Strong magnets are used such as neodymium and or other rare earth magnets that are well known in the art.

The different embodiments of the magnetic coupling system are represented in each of the sets of Figures.

Referring to FIGS. 2-5, one embodiment of the magnetic coupling system consists of extension post 72, magnetic element 74 on the free end of extension post 74 that magnetically couples to back plate 102 mounted to the wall 110.

Figure 6:
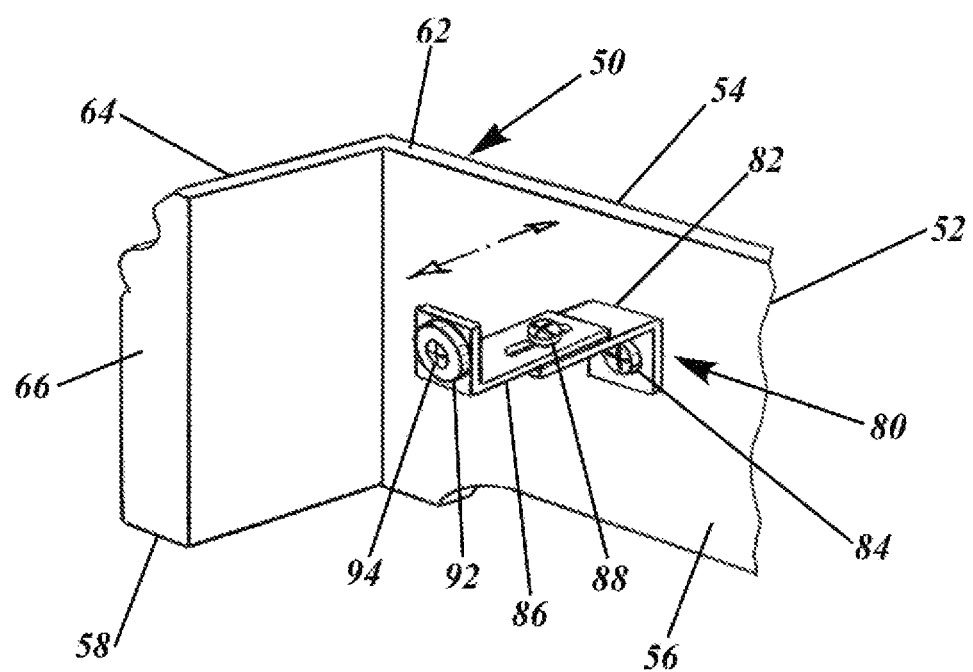
FIG. 6 is a perspective view of another embodiment of a magnetic coupling system that includes an adjustable magnetic mounting bracket for affixing the baseboard heater cover to the baseboard heating system.
Figure 7:
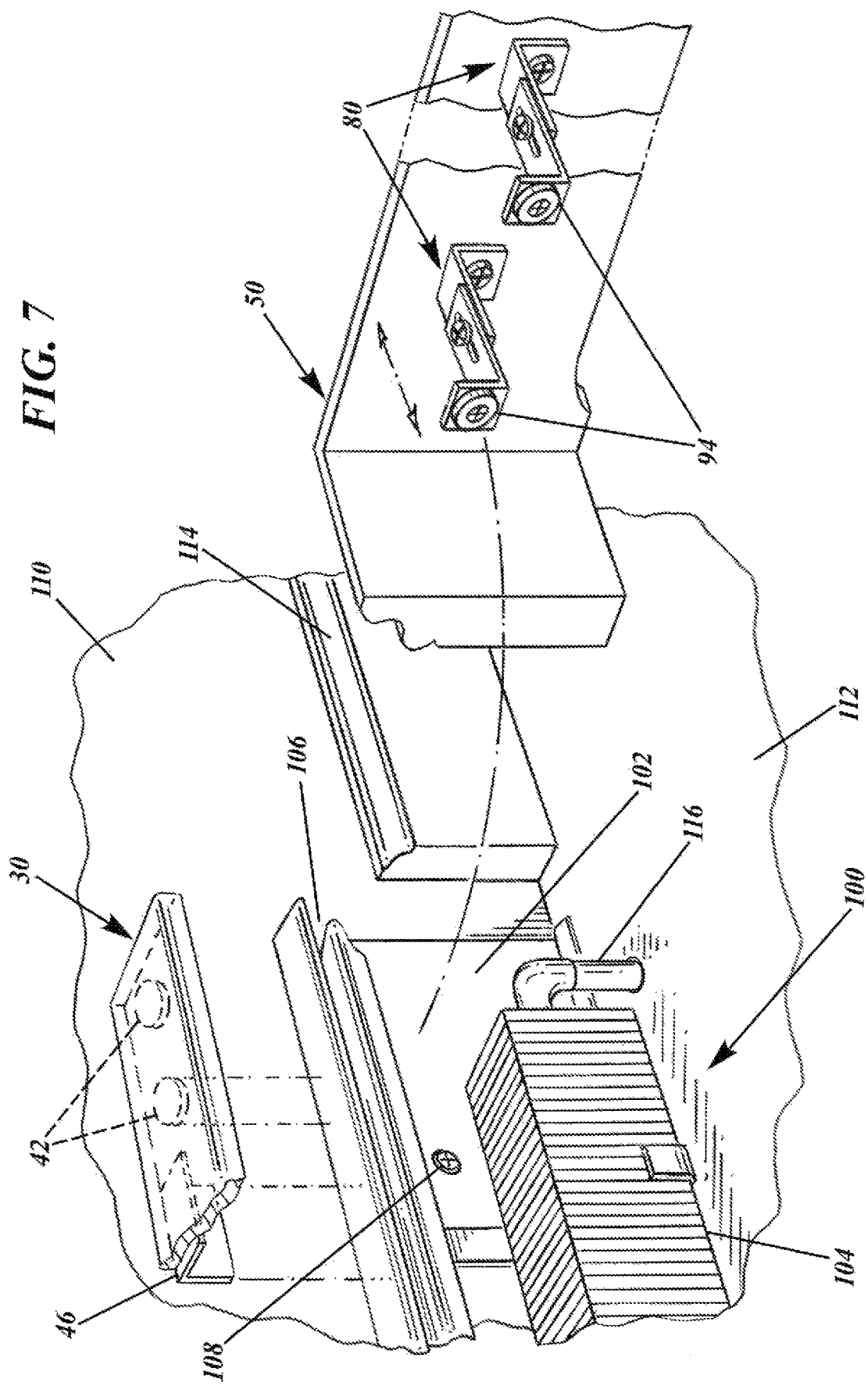
FIG. 7 is an exploded perspective view similar to FIG. 2 showing the relationship between the various elements of the baseboard heater cover of the present invention in use on a conventional baseboard heating system using an adjustable magnetic mounting bracket as shown in FIG. 6.

Referring to FIGS. 6-7, another embodiment of the magnetic coupling system consists of adjustable mounting bracket 82 and magnetic element 92 mounted on the free end of mounting bracket 82 that magnetically couples to back plate 102 mounted to the wall 110.

Figure 10:
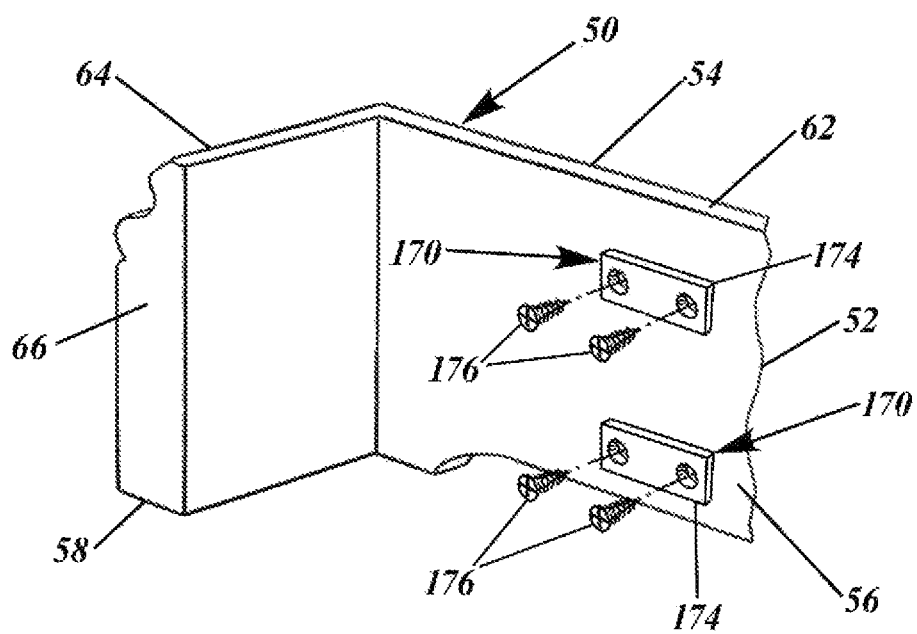
FIG. 10 is an exploded perspective view of another embodiment of a magnetic coupling system for affixing the baseboard heater cover to the baseboard heating system and related parts thereof.
Figure 11:
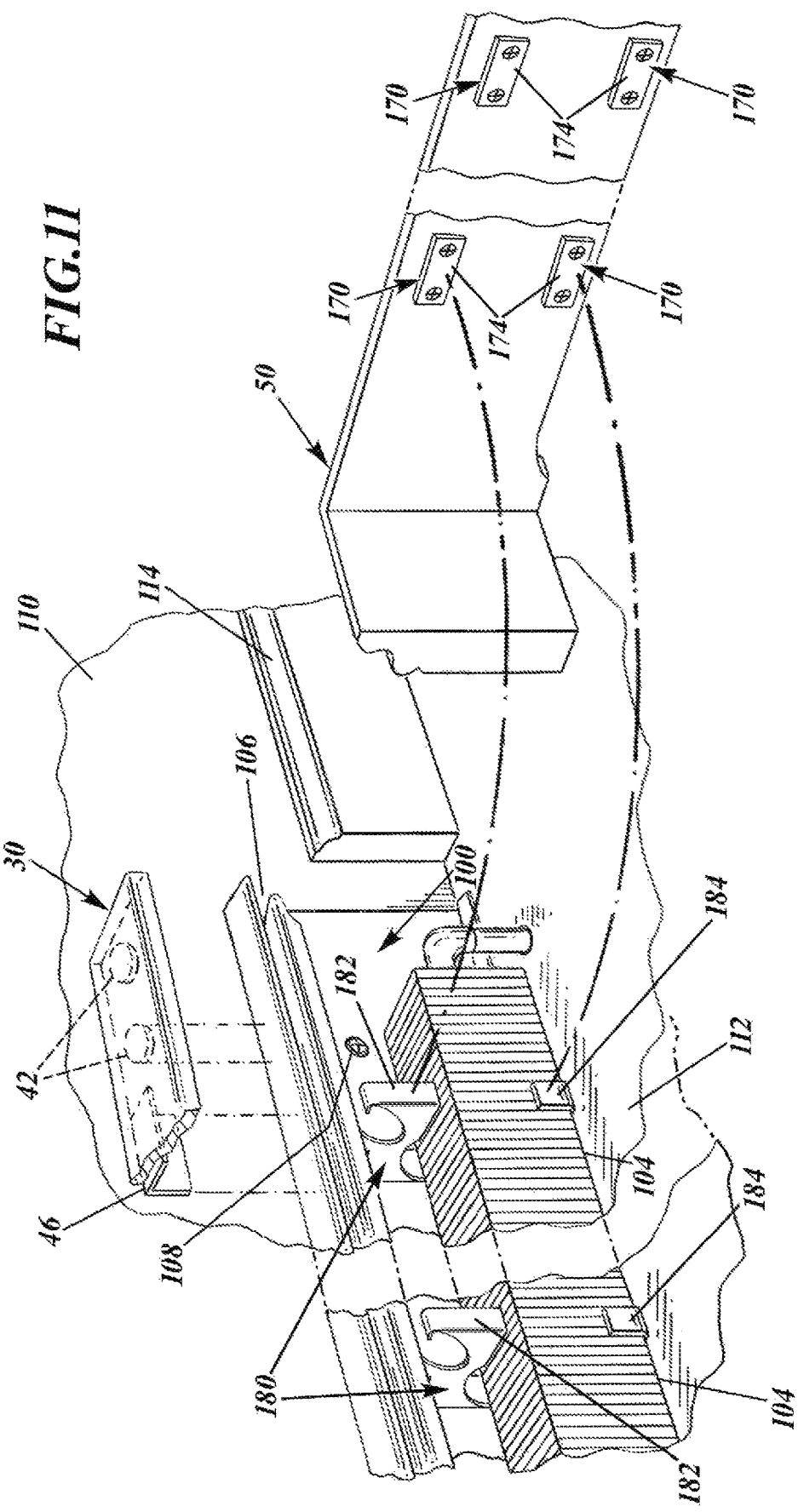
FIG. 11 is an exploded perspective view showing the relationship between the various elements of the baseboard heater cover of the present invention in use on a conventional baseboard heating system using the magnetic coupling means shown in FIG. 10.

Referring to FIGS. 10-11, yet another embodiment of the magnetic coupling system is depicted that consists of magnetic elements 174 mounted to the inside rear surface 56 of front panel 52 that magnetically couples to the metal surfaces 182 and 184 of metal clip 180 that is mounted to back plate 102 that is mounted to the wall 110.

Alternatively, other coupling systems may be used, such as, but not limited to, hook-and-loop coupling systems (not shown).

Referring to FIG. 2, the existing radiator or baseboard heater 100 is shown with the original front face-plate and end-caps removed in order to accept the addition of the current replacement baseboard heater cover 20. Attached to wall 110 is the existing heat reflective metal back plate 102 of radiator 100 which is affixed to the wall 110 with screws 108. The metal back plate 102 reflects the heat toward the interior of the room and is adjacent, secured to and rests directly upon the wall 110 of the room as heat emanates from the radiating heat fins 104.

Referring to FIGS. 1-5, the heater cover 50 is attached to the baseboard heating system 100 by way of a magnetic coupling system 70 that attaches the heater cover to the metal back plate 102 mounted to wall 110.

Referring to FIGS. 3, 4 and 5, the baseboard heater cover 20 of this invention may include a top damper cap trim piece 30 which may be attached by way of L-shaped metal brackets 46 between the wall 110 and over damper cap 106. The top damper cap trim piece 30 has a front edge surface 32, end surfaces 34, top surface 36, bottom surface 37 and rear surface 38. Magnetic element 42 is attached via screw 44 to bottom surface 37 of damper cap trim piece 30 to enable the top damper cap trim piece 30 to be coupled to the existing metal damper cap 106. L-shaped brackets 46 are also attached to bottom surface 37 using screws 48. The L-shaped brackets 46 are positioned between the metal backing plate 102 and wall 110. It should be understood that the number of magnets 42 and L-shaped brackets 46 will need to be determined on a case by case means for secure mounting.

The primary heater cover 50 includes a front panel trim piece 52 having an outward facing surface 54, rear facing surface 56, bottom surface 58 and top surface 62. Attached on both ends of primary heater cover 50 are end pieces 64 that have a rear surface 66 that abuts the existing (or new) baseboard molding trim 114. Extending from rear surface 56 of the primary heater cover 50 are one or more magnetic coupling means 70. The coupling means 70 consist of a predetermined sized post 72 that is mounted at one end to rear surface 56 of the heater cover 50 using conventional methods, e.g., screws or adhesives. Mounted to the other end of post 72 is a magnetic element 74. As depicted in FIG. 5, the magnetic element 74 is attached to the post with screws 76, although other means for attachment are contemplated, e.g., glue. The predetermined length of the posts 72 is determined by the measurement of the distance between the rear facing surface 56 and back plate 102 mounted to the wall 102. The number of posts 72 required is determined by the length of the baseboard heating system 100. In use, the magnetic element 74 on each post 72 engages with and coupled to the back plate 102 for securing the primary heater cover 50 in a stable yet removable and easily replaceable fashion.

FIGS. 6 and 7 describe another embodiment of the magnetic coupling means wherein an adjustable post 80 is mounted at one end to rear surface 56 of the primary heater cover 50 using conventional methods, e.g., screws or adhesives. The adjustable post 80 is preferably an adjustable bracket to allow for the precise sizing and fitment of the post 80 for coupling to the back plate 102. The adjustable post 80 depicted in FIGS. 6 and 7 is mounted to primary heater cover 50 by way of screw 84 securing first bracket 82 to rear facing surface 56. Positioned above bracket 82 is second bracket 86 secured using a set-screw 88. The second bracket 82 is extendable to provide various lengths of the post 80 to accommodate different distances between the rear facing surface 56 and the back plate 102 for a proper installation of the primary heater cover. Attached to the end of second bracket 86 is a magnetic element 92 using screw 94, although glue or other means may be used. The brackets 82 and 86 can be made from a non-magnetic material such as aluminum so as to not affect the magnetic properties of the magnetic element 92.

This invention contemplates various type adjustable posts for use in the magnetic coupling system. e.g., sliding tubes, tubes threaded into each other, springs, etc. (not shown).

Figure 8:
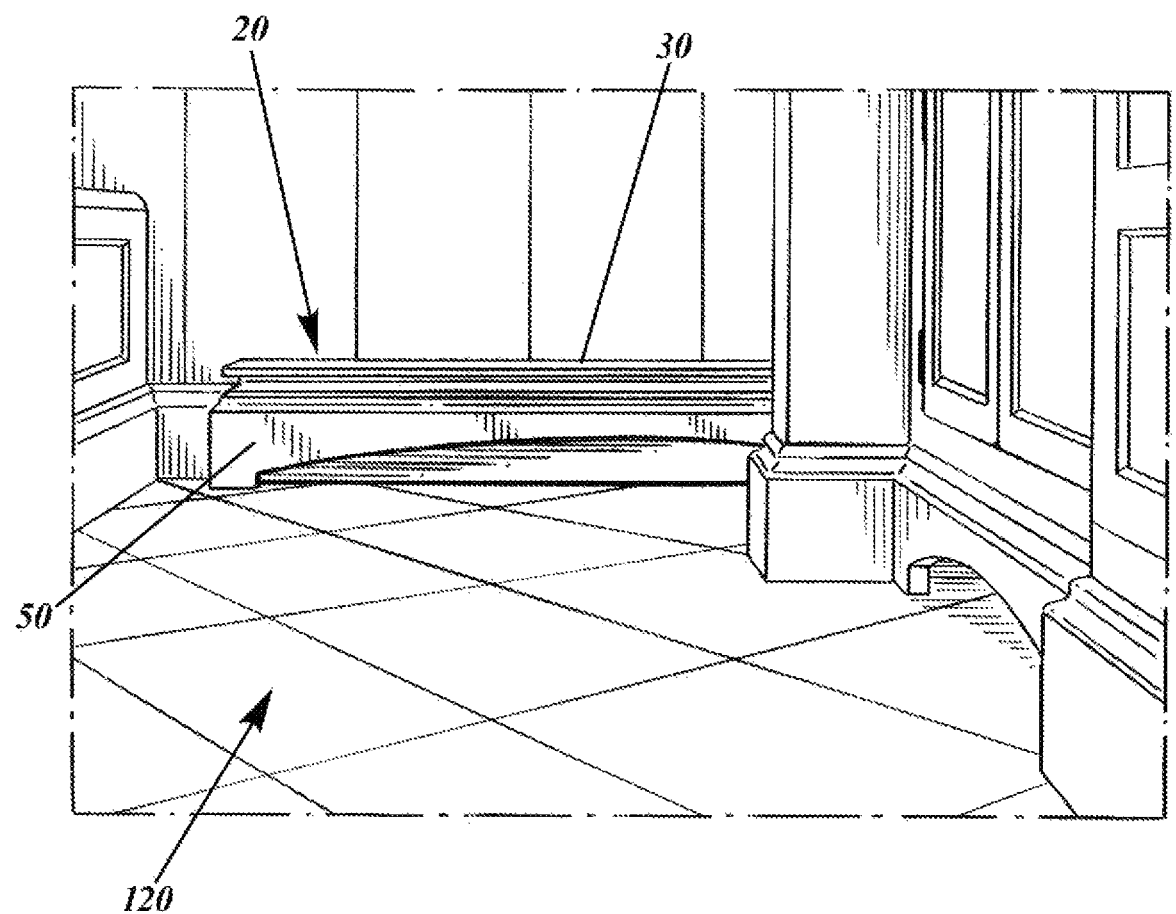
FIG. 8 is a perspective view depicting the baseboard heater cover installed within an existing room setting wherein the design of the trim profile can be selected to aesthetically match the existing overall style and/or molding of the room.
Figure 9:
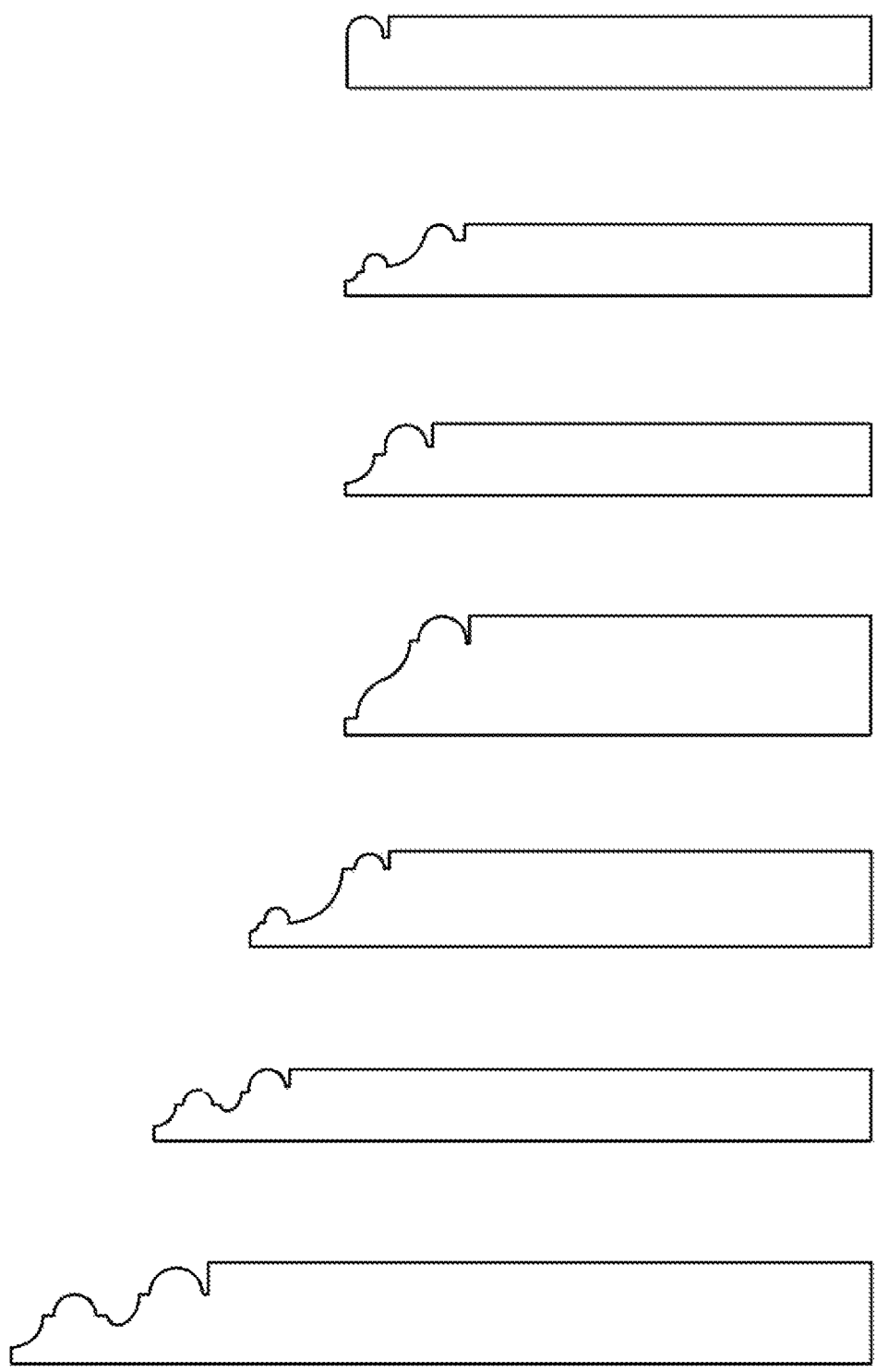
FIG. 9A through FIG. 9G are profile views of various base molding designs that can be utilized when configuring the baseboard heater cover of this invention.

FIG. 8 is an example of the radiator primary heater cover 20 of the present invention that has been configured to emulate the style of the trim and architectural style used in an existing room 120. This may be a replacement of the conventional metal covers for baseboard heating systems or newly installed baseboard heating systems.

Referring to FIGS. 9A through 9G various base molding shapes and profiles are shown that can be used in the design and structure of the primary heater cover 50. The height and width can vary depending on the application needed. These profiles can also be used for replacement of existing baseboards 114 surrounding the baseboard heating system 100 or used for new construction trim or remodeling.

FIGS. 10 and 11 represent another embodiment of the magnetic coupling means 170 for the heater cover 50. In this embodiment, the previously installed baseboard heating system 100 includes a series of metal clips 180 for the purpose of mounting the metallic front cover to the heating system and maintaining the position of the radiating heat fins 104. The metallic front cover has been removed for the purposes of replacing it with the front cover 50 of this invention. The magnetic elements 174 are in the form of upper and lower flush mounted rectangular magnetic elements 174 that are attached via screws 176 (or other means, e.g., glue) onto rear facing surface 56 of heater cover 50. The metal clips 180 include an upper flat metal surface 182 and a lower flat metal surface 184 that receive, respectively, the upper and lower magnetic elements 170 attached to the rear facing surface 56 of primary heater cover 50. In practice, the installer of this invention would determine the relative positions of the metal clips 180 for the appropriate placement of the magnets 174 and also add shim washers if needed to compensate for any resultant horizontal space gaps between magnetic elements 170 and brackets 180.

The present invention is provided to be unique and stylish, yet is designed to be practical and easy to install and replace the metal covers on baseboard heating systems 100. According to preferred embodiments, the heater cover 50 front or outward facing surface 54 and the top damper cap trim piece 30 may be provided in a variety of colors and patterns, or a simple matte white paintable finish.

According to another embodiment, the baseboard heater cover and trim piece may be provided in kit form, which may be installed by a contractor or a homeowner.

The baseboard heater cover system of this invention is simple to install as a new construction baseboard heater system or to retrofit an old baseboard heater system by replacing the old cover system from an already installed baseboard heater systems. The baseboard heater cover of this invention is preferably formed of wood or molded plastic which will not deform under the expected temperatures, is non-rusting, lightweight, will not show dents, can come in colors and different molding configurations, and allows for the full circulation of the heated air through the heater cover. The present invention also allows for immediate access to the radiating heat fins and piping should it be necessary.

The current invention allows a homeowner or contractor to custom configure the appearance of the baseboard heater cover in a visually pleasing way to match existing decor and trim being used within each room. The heater covers may also be repainted or stained to a desired color or decorative motif. The dimensional aspects of the invention can be sized to accommodate various types of prior installations such as full room perimeter baseboard radiators, single smaller radiator sections within a room or to be expanded by way of a heating contractor to provide additional heating zones during the course of remodeling or new construction. This can be done using aesthetically pleasing and matching trim along.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

The invention claimed is:

1. A baseboard heating system mounted proximate a juncture of a wall and a floor of a room, the system comprising:
   a length of longitudinal piping for the passage of a heated liquid there through;
   radiating heat fins surrounding the length of longitudinal piping;
   a heat reflective metal backplate mounted to the wall behind the length of longitudinal piping and the radiating heat fins;
   a baseboard heater cover for covering the longitudinal piping and radiating heat fins supported by the floor and extending at least the length of the longitudinal piping and the radiating heat fins, the baseboard heater cover having an interior surface facing the heat reflective metal backplate mounted to the wall;
   a plurality of posts each post having a first end and an opposed second end, the first end of each post mounted to the interior surface of the baseboard heater cover and the opposed second end of each post having a magnet mounted thereto, each post being of a length that extends from the baseboard heater cover interior surface to the heat reflective metal backplate mounted to the wall and spaced above the radiating heat fins when the baseboard heater cover is positioned to cover the longitudinal piping and radiating heat fins;

wherein the baseboard heater cover may be selectively removed to access the longitudinal piping and radiating heat fins and selectively positioned to cover the longitudinal piping and radiating heat fins, the second end of each post directly magnetically connected to the heat reflective metal backplate mounted to the wall spaced above the radiating heat fins.

2. The baseboard heating system of claim 1, wherein each post is adjustable in length.

3. The baseboard heater cover of claim 1, wherein the a baseboard heating system further includes a metal top damper cap mounted to the wall above the length of the longitudinal piping and radiating heat fins; and a damper cap trim piece is provided that overlays the metal top damper cap and is coupled thereto by a plurality of magnets mounted to the damper cap trim piece along its length between the damper cap trim piece and the damper cap that magnetically couples the trim piece to the metal damper cap.

4. The baseboard heating system of claim 1, wherein the baseboard heater cover is constructed substantially of wood or pressboard.

5. The baseboard heating system of claim 1, wherein the baseboard heater cover is constructed substantially of plastic.

* * * * *